United States Patent
Rong et al.

(10) Patent No.: US 6,775,548 B1
(45) Date of Patent: Aug. 10, 2004

(54) ACCESS CHANNEL FOR REDUCED ACCESS DELAY IN A TELECOMMUNICATIONS SYSTEM

(75) Inventors: Zhigang Rong, Fort Worth, TX (US); Steven D. Gray, Carrollton, TX (US)

(73) Assignee: Nokia Mobile Phones Ltd., Espoo (FI)

( * ) Notice: Subject to any disclaimer, the term of this patent is extended or adjusted under 35 U.S.C. 154(b) by 0 days.

(21) Appl. No.: 09/102,222

(22) Filed: Jun. 22, 1998

(51) Int. Cl.[7] .............................................. H04Q 7/20
(52) U.S. Cl. ..................... 455/452; 370/468; 455/67.1
(58) Field of Search ................................ 455/455, 452, 455/422, 67.1, 67.4, 68, 70, 73, 522, 69, 63; 375/216, 225; 370/465–468, 252, 253

(56) References Cited

U.S. PATENT DOCUMENTS

| | | | | |
|---|---|---|---|---|
| 4,592,049 A | * | 5/1986 | Killat et al. ................... 370/87 |
| 4,815,073 A | * | 3/1989 | Grauel et al. .................. 370/95 |
| 4,910,794 A | * | 3/1990 | Mahany ........................ 455/67 |
| 5,404,355 A | | 4/1995 | Raith ......................... 370/95.1 |
| 5,425,101 A | * | 6/1995 | Woo et al. ..................... 380/23 |
| 5,483,676 A | | 1/1996 | Mahany et al. ............. 455/67.4 |
| 5,533,004 A | * | 7/1996 | Jasper et al. ................... 370/11 |
| 5,563,895 A | | 10/1996 | Malkamaki et al. .......... 371/32 |
| 5,612,950 A | | 3/1997 | Young ......................... 370/276 |
| 5,703,902 A | * | 12/1997 | Ziv et al. ..................... 375/200 |
| 5,706,428 A | * | 1/1998 | Boer et al. .................. 395/200 |
| 5,740,166 A | * | 4/1998 | Ekemart et al. ............ 370/331 |
| 5,822,318 A | * | 10/1998 | Tiedemann, Jr. et al. ... 370/391 |
| 5,857,147 A | * | 1/1999 | Gardner et al. ............ 455/67.1 |
| 5,872,775 A | * | 2/1999 | Saints et al. ................ 370/342 |
| 5,923,648 A | * | 7/1999 | Dutta .......................... 370/280 |
| 5,963,548 A | * | 10/1999 | Virtanen ...................... 370/335 |
| 5,974,032 A | * | 10/1999 | Snowden et al. ........... 370/316 |
| 5,978,414 A | * | 11/1999 | Nara ........................... 375/225 |
| 6,005,855 A | * | 12/1999 | Zehavi et al. ............... 375/200 |
| 6,128,322 A | | 10/2000 | Rasanen et al. ............ 370/536 |
| 6,219,343 B1 | | 4/2001 | Honkasalo et al. ......... 370/355 |
| 2001/0012271 A1 | | 8/2001 | Berger ........................ 370/230 |

* cited by examiner

*Primary Examiner*—Edward F. Urban
*Assistant Examiner*—C. Chow
(74) *Attorney, Agent, or Firm*—Brian T. Rivers

(57) ABSTRACT

A method and apparatus for accessing a telecommunications system. A channel having a plurality of data rates and a plurality of frame sizes is utilized by a mobile station to gain access to the system. If channel conditions allow, a faster data rate of the available data rates and a smaller frame size of the available frame sizes may be used to request access over the channel. By dynamically determining the data rate based on channel conditions, overall access delays for mobile stations using packet data services and making many access attempts may be reduced.

30 Claims, 4 Drawing Sheets

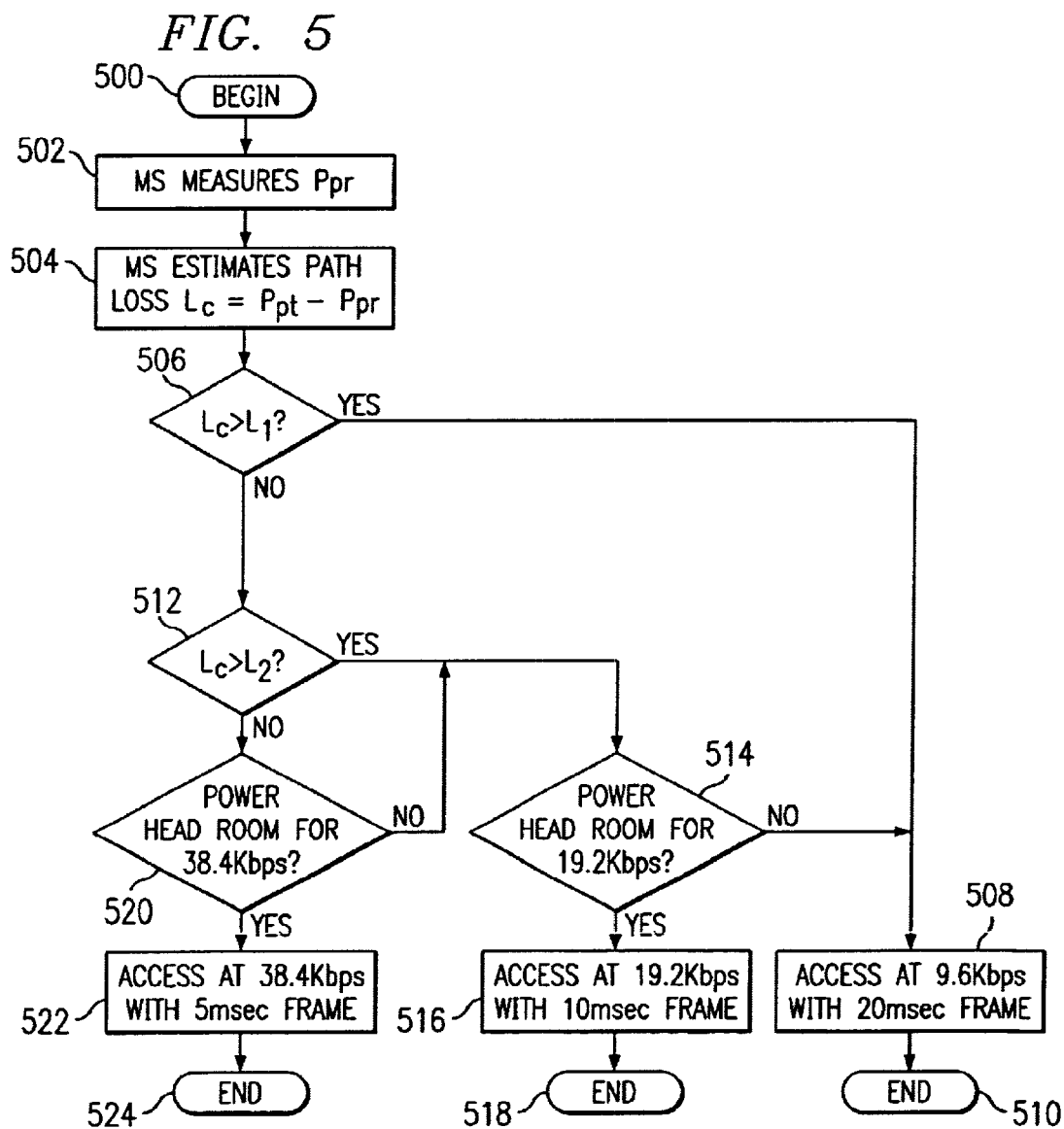

ACCESS CHANNEL FOR REDUCED ACCESS DELAY IN A TELECOMMUNICATIONS SYSTEM

FIELD OF THE INVENTION

This invention relates to telecommunications systems and, more particularly, to a method and apparatus for accessing a system utilizing an access channel providing reduced access delay in a telecommunications system.

BACKGROUND OF THE INVENTION

Major cellular telecommunications systems types include those operating according to the Global Services for Mobile (GSM) Standard, the TIA/EIA/IS-95 Mobile Station-Base Station Compatibility Standard for Dual Mode Wide Band Spread Spectrum Cellular Systems (IS-95A, currently being updated as IS-95B in the document TIA/EIA SP-3693), the TIA/EINIS-136 Mobile Station-Base Station Compatibility Standard (IS-136), and the TIA/EIA 553 Analog Standard (AMPS/TACS). Other major cellular systems include those operating in the personal communications system (PCS) band according to the IS-95 based ANSI-J-STD-008 1.8–2.0 GHz standard or those operating according to the GSM-based PCS 1900/1910 MHz frequency range standard. Currently, each of the major cellular system standards bodies is implementing packet data services into its digital cellular specifications. A packet data specification has been finalized for GSM and IS-95A. Packet data specifications compatible with the IS-136 and IS-95B standards are also being prepared.

In a typical cellular system a call establishment begins either by a base station transmitting a paging message to a mobile station on a paging channel and then the mobile station transmitting a paging response message to the base station on an access channel, or by a mobile station accessing the system on an access channel by transmitting an origination message to a base station. In either of these call establishment cases, the mobile station must access the system on an access channel, and information unique to the particular call establishment must be exchanged between the mobile station and base station over the access channel or other channels of the system air interface. The paging response message and origination message typically carry a large portion of the information. The information unique to the particular call establishment could include called number data, mobile station identification and capability related data, authentication information, etc. After receiving this information, the system must then use the information to set up the different layers of communication necessary in the system to implement the call.

In packet data applications, a mobile station establishes a connection with the base station when it has one or more data packets in the buffer of the mobile station to send or when it is paged by a base station having data packets to send. The mobile station accesses the system for a channel connection and transmits until it is determined that no data exists in the buffer for transmission. Since data may be received from a data server at the mobile or base station intermittently, it may be necessary to release the channel connection in order to maximize the use of the channel by other mobile stations. This means that the mobile station will be making multiple access attempts to establish a channel connection, each access attempt being made when the mobile or base station has enough data to transmit. Each access attempt may in itself involve more than one access attempt if initial access attempts are unsuccessful. In the current packet data system for GSM, IS-95A, IS-95B and IS-136, the access channel has a fixed frame size and data rate. For example, the IS-95B packet data access channel is the same channel used to originate regular calls. The IS-95B access channel has a frame size of 20 msec and a data rate of 4.8 kbps.

As third generation systems which will replace GSM, IS-136 and IS-95B are developed and packet data usage becomes more common, solutions must be found to handle packet data service delays that may be caused by the delays incurred when requesting access to the system each time packet data is to be sent. If many packet data users are in the system competing for channels, there will be a need to release access channels as often as possible and a need to perform new accesses following release of the accessed channel if new data is accumulated for transmission. An improved access procedure will be required for packet data services in these systems.

OBJECTS OF THE INVENTION

It is, therefore, an object of this invention to provide an improved method and apparatus for accessing a telecommunications system that overcomes the foregoing and other problems.

Another object of this invention is to provide a method and apparatus for accessing a telecommunications system using a channel providing reduced access delay.

Another object of this invention is to provide a method and apparatus for accessing a telecommunications system using a channel having variable data rates and frame sizes for access.

A further object of this invention is to provide a method and apparatus for accessing a telecommunications system using a channel having variable data rates and frame sizes assignable to a mobile station based on channel conditions and service type required.

SUMMARY OF THE INVENTION

The present invention provides an improved method and apparatus for accessing a telecommunications system. The method and apparatus utilizes a channel having variable data rates and frame sizes. In the method and apparatus, access to the system may be requested via at least one channel having variable data rates. Each of the available data rates is associated with at least one transmission frame size of a plurality of frame sizes. If channel conditions allow, a higher data rate of the available data rates may be used to request access over the channel. The method and apparatus has an advantage for use in packet data services. By dynamically determining the data rate based on channel conditions, overall access delays for mobile stations using packet data services and making many access attempts may be reduced.

In an embodiment of the invention, a plurality of access channel data rates and frame durations are available for use by a mobile station requesting access. The data rates and frame durations may be set so that the number of data bits per frame is constant for ease of processing. A mobile station accessing the system selects a data rate and associated frame duration based on channel conditions, mobile station power conditions or the type of service required. Packet data service users requiring shorter access delay may select a higher data rate and associated frame duration for a particular type of service under certain channel conditions, subject to transmission power requirements. Since a higher data rate requires a higher transmitted power to achieve a comparable Eb/No as at a lower data rate, transmission power of the mobile station at the higher rate must be increased compared to that at the lower rate without exceeding the maximum allowable transmitted power for the mobile station so the frame error rate (FER) and bit error rate (BER) remain within acceptable limits.

Transmission power requirements may be determined on the basis of a desired Eb/No to be received at the base station antenna for access attempts by the mobile station. The mobile station determines whether an estimated path loss is less than a maximum allowable path loss for a desired data rate for access. If the estimated path loss is less than the maximum allowable path loss at the desired data rate for access and the mobile station transmission power necessary to achieve the desired Eb/No does not exceed the maximum allowed power the mobile station is limited to for acceptable system performance, the desired data rate is selected. If the estimated path loss is greater than the maximum allowable path loss for the desired data rate for access or the necessary mobile station transmission power exceeds the allowable maximum for the mobile station, a lower data rate having a maximum allowable path loss greater than the estimated path loss and/or greater than the maximum allowed power for the mobile station is selected.

BRIEF DESCRIPTION OF THE DRAWINGS

The above set forth and other features of the invention are made more apparent in the ensuing Detailed Description of the Invention when read in conjunction with the accompanying drawings wherein:

FIG. 5 is a flow diagram illustrating process steps performed when accessing a system according to an embodiment of the invention.

DETAILED DESCRIPTION OF THE INVENTION

Figure 1:
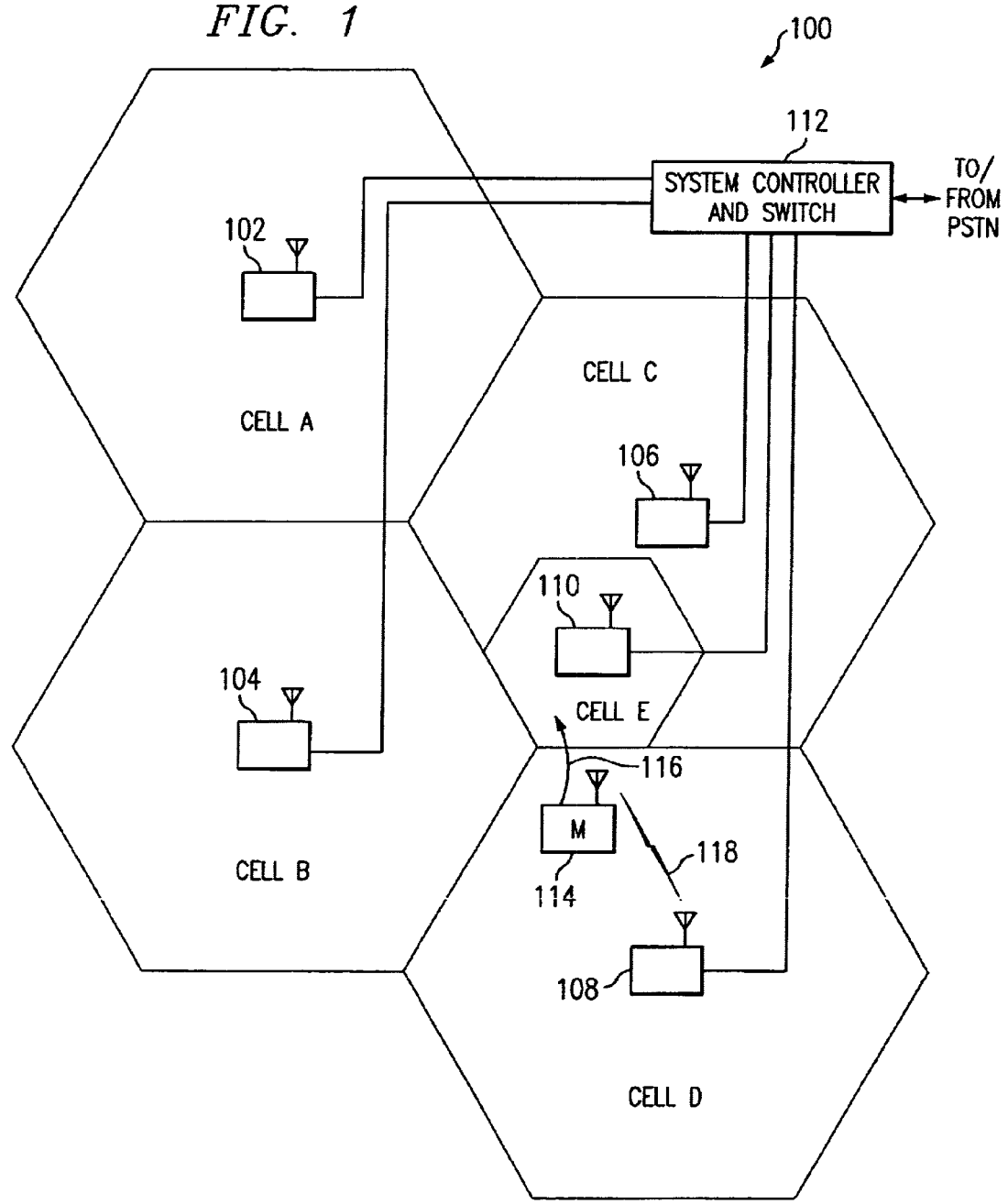
FIG. 1 illustrates a block diagram of a telecommunications system constructed according to an embodiment of the present invention.

FIG. 1 illustrates a block diagram of a telecommunications system 100 constructed according to an embodiment of the present invention. System 100 comprises mobile station 114, and an infrastructure comprising system controller and switch 112 and base stations 102, 104, 106, 108 and 110. A subscriber who subscribes to service provided by the operator of cellular system 100 may use mobile station 114 to make and receive phone calls over a radio interface, such as shown by radio interface 118 between mobile station 114 and base station 108, as the subscriber moves throughout the coverage area of cellular system 100. The subscriber also may use mobile station 114 to make and receive packet switched data calls over the radio interface 118. During a packet data call, mobile station 114 may function as a data terminal for transmitting or receiving data. As such, mobile station 114 may be connected to a portable computer or fax machine. Each of base stations 102, 104, 106, 108 and 110 provides coverage over a separate area of system 100, shown as cell A, cell B, cell C, cell D and cell E, respectively, in FIG. 1. Base stations 102, 104, 106, 108 and 110 are connected to system controller and switch 112 by connections as in a conventional cellular system. System controller and switch 112 may be connected to a public switched telephone network to allow subscribers of cellular system 100 to make and receive phone calls from the landline public network. In the embodiment of FIG. 1, cell A, cell B, cell C and cell D are shown to be of about the same size and may be the size of what is commonly called a "microcell" or a cell of about 500 meters in width. A micro cell of system 100 may require a maximum mobile station transmission power level of approximately 200 mw. Cell E of system 100 is shown to be contained within the coverage area of cell C and may be the size of what is commonly called a "picocell" or a cell of about 100 meters in width. A picocell of system 100 may require a maximum mobile station transmission power level of approximately 20 mw. The embodiment of the invention has particular application to packet data users operating in a microcell or picocell environment. In this type of environment, signal path loss between the mobile station 114 and base stations 102–108 may be small, allowing necessary transmission power increases by mobile station 114 required for faster data rate and small frame access attempts. However, the embodiment has application to cellular systems having all sizes of cells. In the embodiment of FIG. 1, cellular system 100 may operate according to the Code Division Multiple Access (CDMA) cellular system standard specified in the document, "The CDMA 2000 ITU-R RTT Candidate Submission," published by the Telecommunications Industry Association, TR45.5 Subcommittee, Apr. 2, 1998 (CDMA 2000). The method and apparatus of the invention has application to all types of telecommunications systems that use similar access principles, such as, for example, time division multiple access (TDMA) systems.

Figure 2:
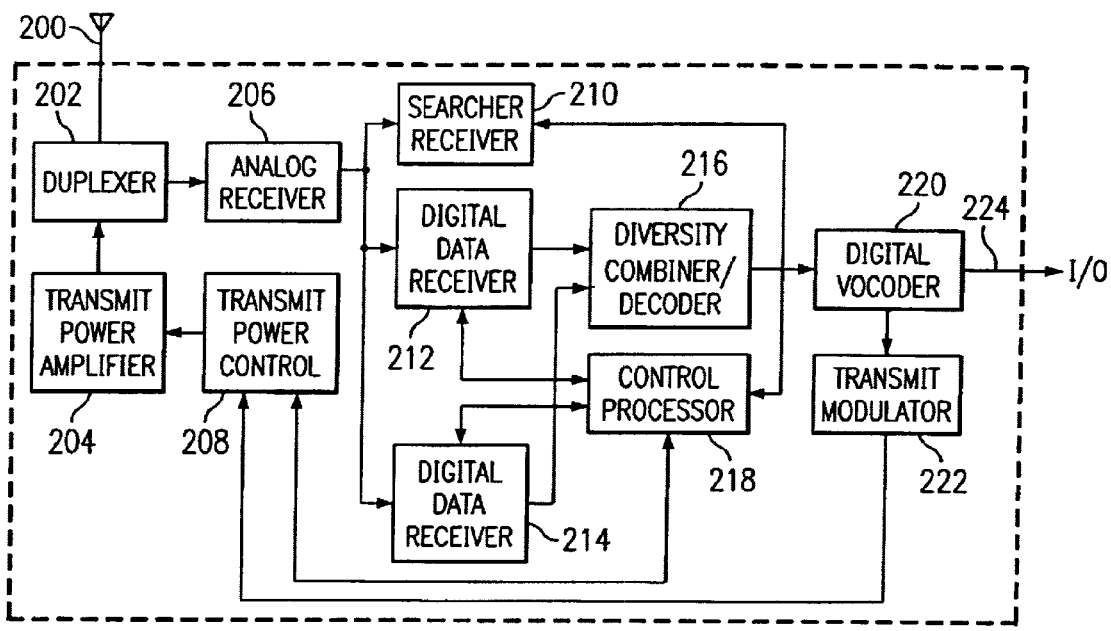
FIG. 2 is a block diagram of portions of a mobile station of the embodiment of the invention shown in FIG. 1.

Referring now to FIG. 2, therein is a block diagram of portions of mobile station 114 of the embodiment of the invention shown in FIG. 1. Mobile station 114 comprises antenna 200, duplexer 202, transmit power amplifier 204, analog receiver 206, transmit power controller 208, searcher receiver 210, digital data receiver 212, digital data receiver 214, diversity combiner/decoder 216, control processor 218, user digital vocoder 220, transmit modulator 222 and user interface 224.

Antenna 200 is coupled to analog receiver 206 through duplexer 202. Signals received at antenna 200 are input to analog receiver 206 through duplexer 202. The received signals are then converted to an IF frequency and then filtered and digitized in analog receiver 206 for input to digital data receiver 212, digital data receiver 214 and searcher receiver 210. The digitized IF signal input to digital data receiver 212, digital data receiver 214 and searcher receiver 210 may include signals from many ongoing calls, together with the pilot carriers transmitted by the base station of the cell site in which the mobile station is currently located, plus the pilot carriers transmitted by the base stations in all neighboring cell sites. Digital data receiver 212 and digital data receiver 214 perform correlation on the IF signal with a pseudo random noise (PN) sequence of a desired received signal. The output of digital data receivers 212 and 214 is a sequence of encoded data signals from two independent paths. Searcher receiver 210 scans the time domain around the nominal time of a received pilot signal of a base station for other multi-path pilot signals from the same base station and for other signals transmitted from different base stations. Searcher receiver 210 measures the strength of any desired waveform at times other than the nominal time. Searcher receiver 210 generates signals to control processor 218 indicating the strengths of the measured signals to control processor 218.

The encoded data signals output from digital data receiver 212 and digital data receiver 214 are input to diversity combiner/decoder 216. In diversity combiner/decoder 216 the encoded data signals are aligned and combined, and the resultant data signal is then decoded using error correction and input to digital vocoder 220. Digital vocoder 220 then outputs information signals to the user interface 224. User interface may be a handset with a keypad or another type of user interface, such as a laptop computer monitor and keyboard.

For transmission of signals from mobile station 114, a signal received at user interface 224 is input to user digital vocoder 220 in digital form as, for example, data or voice that has been converted to digital form at user interface 224. In digital vocoder 220 the signal is encoded and output to transmit modulator 222. Transmit modulator 222 Walsh encodes the signal and then modulates the Walsh encoded signal onto a PN carrier signal, with the PN carrier sequence being the PN carrier sequence of the CDMA channel to which the mobile station is assigned. The PN carrier information is transmitted to mobile station 114 from the system 100 and transferred to control processor 218 from digital data receivers 212 and 214 after being received from the system. Control processor 218 sends the PN carrier information to transmit modulator 222. The PN modulated signal is then output from transmit modulator 222 to transmit power controller 208. Transmit power controller 208 sets the level of the transmission power of mobile station 114 according to commands received from control processor 218. In the embodiment of the invention, the transmission power is dependent on the data rate and frame size used for access. Control processor 218 also generates commands that set the transmission data rate and frame sizes used for access. The power control commands may be generated by control processor 218 according to commands received from the system or may be generated by software of control processor 218, according to the embodiment of the invention, in response to data received from th e system through digital data receivers 212 and 214.

The modulated signal is then output from transmit power controller 208 to transmit power amplifier 204 where the signal is amplified and converted to an IF frequency signal. The IF frequency signal is then output from power amplifier 204 to duplexer 20 2 and transmitted from antenna 200.

Figure 3:
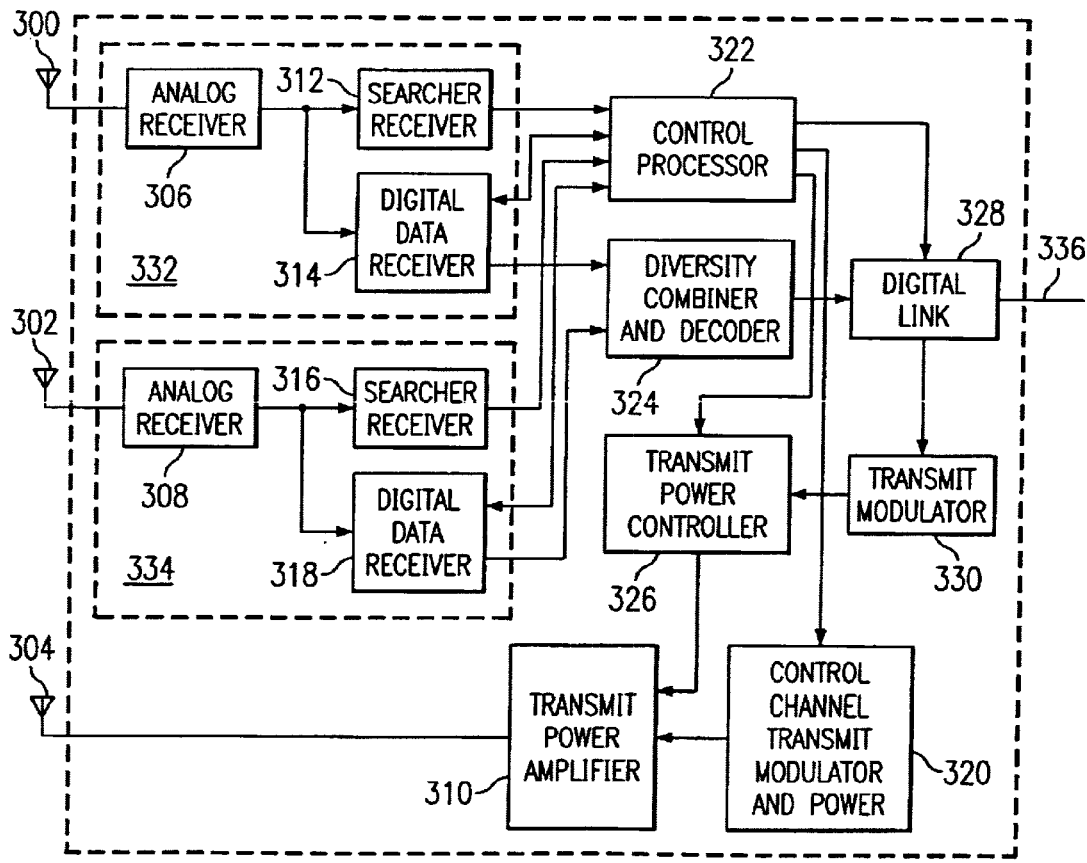
FIG. 3 is a block diagram of portions of a base station of the embodiment of the invention shown in FIG. 1.

Referring now to FIG. 3, therein is a block diagram of portions of a base station 110 of the embodiment of the invention shown in FIG. 1. The block diagrams of any of the other base stations 102, 104, 106, and 108 of FIG. 1 may be equivalent to that shown in FIG. 3 for base station 110. Base station 110 includes a first receiver section 332, a second receiver section 334, control processor 322, diversity combiner/decoder 324, transmit power controller 326, digital link 328, input/out I/O 336, transmit modulator 330, control channel transmitter/modulator 320, transmit power amplifier 310, and antenna 304. First receiver section 332 comprises antenna 300, analog receiver 306, searcher receiver 312 and digital data receiver 314. Second receiver section 334 comprises antenna 302, analog receiver 308, searcher receiver 316 and digital data receiver 318.

First receiver section 332 and second receiver section 334 provide space diversity for a single signal that may be received at both antennas 300 and 302. The signals received at antenna 300 are input to analog receiver 306 where the signal is filtered, converted to an IF frequency and digitized to generate a digital signal. The digital signal is then output from analog receiver 306 to searcher receiver 312 and digital data receiver 314. Searcher receiver 312 scans the time domain around the received signal to verify that digital data receiver 314 tracks the correct signal. Control processor 322 generates the control signals for digital data receiver 314 according to a signal received from the searcher receiver 312, so that the correct signal is received at digital data receiver 314. Digital data receiver 314 generates the proper PN sequence necessary to decode the digital signal received from analog receiver 306 and generates weighted output symbols for input to diversity combiner/decoder 324. Antenna 302, analog receiver 308, searcher receiver 316 and digital data receiver 318 of second receiver section 334 function identically to the components of first receiver section 332 to generate a second set of weighted output symbols. The weighted symbols from digital data receiver 314 and digital data receiver 318 are then combined and decoded in diversity combiner/decoder 324 to generate received digital data which is then output through digital link 328 and I/O 336 to system controller and switch 112 of FIG. 1.

When data received from system controller and switch 112 is to be transmitted from base station 110 on a traffic channel, the data is received at digital link 328 over I/O 336 and sent to transmit modulator 330. Transmit modulator 330 then modulates the data using the appropriate Walsh function assigned to the mobile station to which the base station is transmitting. The Walsh modulated data is then spread by a voice channel PN sequence having the appropriate time shift and input to transmit power controller 326. Transmit power controller 326 controls the transmission power in response to control signals received from control processor 322. The power control commands may be generated by software in control processor 322. The signal output from power controller 326 is input to transmit power amplifier 310 and then transmitted from antenna 304. Base station 100 may have multiple transmit modulator and transmit power controllers for transmitting to multiple mobile stations.

In system 100, a pilot channel that may be used for handoff measurements is generated by each base station. The pilot channel generated for each base station of system 100 is unique, with each pilot identified by the time shift (or phase) of the PN sequence transmitted from the particular base station rather than by a unique PN sequence. The pilot channel for base station 110 may be generated in control channel transmitter/modulator 320 in response to control signals generated by control processor 322. The pilot channel signal may be generated by using a Walsh code sequence of all zeros and multiplying the Walsh code sequence by the system PN sequence to generate a pilot channel signal having the appropriate phase for the base station 110. System 100 also utilizes at least one reverse pilot channel and at least one access channel from mobile station 114 to base station 108. Each access channel is associated with a reverse pilot channel that is generated by using a Walsh code sequence of all zeros. The reverse pilot channel and access channel are used to obtain access to the system.

Figure 4A:
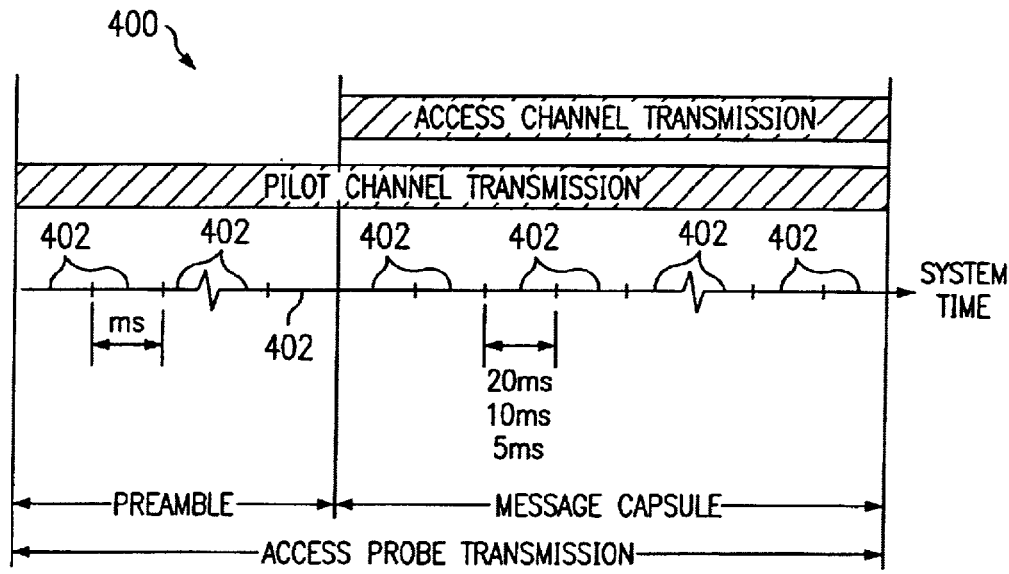
FIGS. 4A and 4B are illustrations of an access probe transmission and access probe sequence, respectively, according to an embodiment of the invention.
Figure 4B:
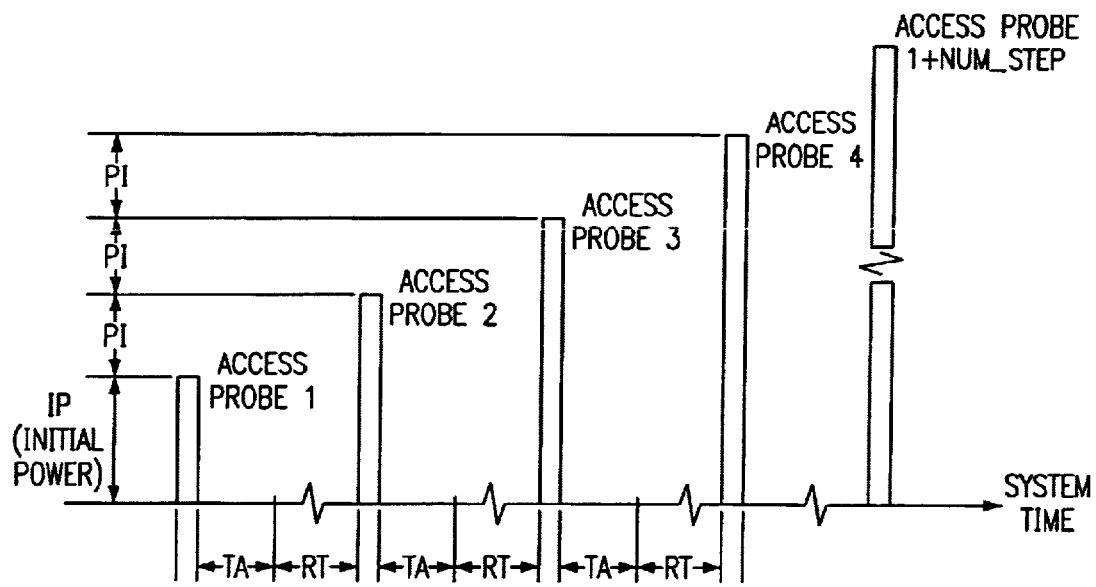

Referring now to FIGS. 4A and 4B, therein are illustrated the access channel structure and an access probe sequence, respectively, of an embodiment of the invention. In FIG. 4A the system time is shown as a series of consecutive access channel frames 402 on the system time access. The access probe transmission 400 comprises a preamble and a message capsule. The access probe transmission 400 has a duration of M×X msec preamble frames transmitted on the reverse pilot channel plus N×L msec message capsule frames transmitted on the access channel, where L and X are variable lengths. The value of X, M and N may be system constants. In the embodiment, the N×L msec message capsule frames may be of duration 20 msec, 10 msec or 5 msec with data rates of 38.4 kbps, 19.2 kbps and 9.6 kbps, respectively. The data rates and frame sizes are set so that the number of data bits per frame is constant for ease of processing. It is not required that each data rate be fixed to a specific frame size. For example, in an alternative of the embodiment, each data rate may be used with multiple frame sizes of 20 msec, 10 msec or 5 msec. For normal voice of circuit switched operations, the message capsule frames are typically 20 msec in duration. For packet switched applications, the message capsule frame duration is variable.

Access probes are transmitted as shown in FIG. 4B. An access probe sequence comprises up to 1+NUM_STEP access probes, where NUM_STEP is a system-defined parameter. The preamble is transmitted on a reverse pilot channel associated with the access channel. The reverse pilot channel space is continuously searched by the base station so mobile station access on the associated access channel can be acquired by the system. In the embodiment of the invention, searcher receivers 312 and 316, and digital data receivers 314 and 318 are configured to search and receive access probes having multiple frame durations of 5 msec, 10 msec and 20 msec, with multiple data rates of 38.4 kbps, 14.2 kbps and 9.6 kbps. Control processor 322 generates the appropriate control signals to cause data and frame rate determination to be performed, so that an access probe is received correctly. The reverse pilot channel and channel used for access are spaced by the same long code. Each access probe begins with access probe 1 and continues up until access probe 1+NUM_STEP if no acknowledgment is received from the base station after a time-out period denoted by TA. Access probe 1 is transmitted at an initial power level, and each succeeding access probe is transmitted at a-power level incremented by PI. In the embodiment of the invention, the power levels used for access are dependent on the message capsule data rate used. The power levels for 9.6 kbps are as set for the CDMA 2000 system. The initial power level, IP, plus power increment, PI, for different access capsule data rates may be scaled such that for a rate of 19.2 kbps transmit power is 3dB above IP for 9.6 kbps, and for a rate of 38.4 kbps transmit power is 6dB above IP for 9.6 kbps. Access probes are separated by the period TA and a random probe backoff time (RT) that are system constants. If no response is received during an access probe sequence, the access probe sequence may be repeated. In an access attempt, the access probe may be repeated up to a number, MAX_SEQ, that is set by the system.

In the embodiment of the invention, when mobile station 114 is involved in a packet data call, mobile station 114 may utilize the variable data rate access probes of the invention to minimize the time needed to obtain access to the system. Mobile station 114 may transmit an access probe to base station 108 in response to a page received on a paging channel or autonomously when mobile station 114 has packet data to be sent.

Referring now to FIG. 5, therein is a flow diagram illustrating process steps performed when accessing a system using variable rate and variable length frames according to an embodiment of the invention. The process begins at step 500. The process may begin at initial access for a packet data call or sometime during the duration of an ongoing packet data call, when a physical channel needs to be re-accessed for continued packet data transmission. This may include mobile station 114 or base station 110 initiated accesses. At step 502, searcher receiver 210 of mobile station 114 measures the received signal strength, $P_{pr}$, of the forward link pilot channel from base station 108. Next, at step 504, control processor 218 calculates an estimated path loss, $L_c$. $L_c = P_{pt} - P_{pr}$, where $P_{pt}$ is the forward link pilot channel transmit power of base station 108. $P_{pt}$ may be fixed based upon the operating environment, cell type, etc., and the value of $P_{pt}$ may be transmitted to mobile station 114 from base station 108 via message signaling. The forward link pilot channel measurements of step 502 and calculations of step 504 need not be done after access is required, as these forward link measurements and calculations may be continuously made and already available when mobile station 114 begins the process at step 500.

At step 506, a determination is made by control processor 218 as to whether or not the calculated path loss $L_c$ is greater than a threshold path loss $L_1$, where $L_1$ is the maximum path loss a signal transmitted from mobile station 114 can incur when transmitting at 19.2 kbps at a reference transmission power. The reference transmission power may be the maximum possible transmit power for mobile station 114. The threshold path loss $L_1$ may be a system value determined based on a desired Eb/No to give a desired frame error rate (FER) and bit error rate (BER) rate. Typically, the transmitted power required to achieve a desired Eb/No at base station 118 increases with an increased data rate. Based on a desired FER and BER, then the allowable path loss for transmitting at 9.6 kbps will be greater than the maximum allowable path loss when transmitting at 19.2 kbps at a selected transmission power.

If, at step 506, a determination is made that $L_c$ is greater than $L_1$, the process moves to step 508. At step 508, control processor 218 generates the appropriate control signals so that mobile station 114 transmits the access probes of FIGS. 4A and 4B using a message capsule with data transmitted at a rate of 9.6 kbps having a frame of 20 msec in length and initial power IP set for 9.6 kbps. The process then ends at step 510. If, however, at step 506, a determination is made that $L_c$ is not greater than $L_1$, the process moves to step 512.

At step 512, a determination is made by control processor 218 as to whether or not the calculated path loss $L_c$ is less than or equal to $L_1$ and greater than $L_2$, where $L_2$ is the maximum path loss a signal transmitted from mobile station 114 can suffer when transmitting at 38.4 kbps at the reference transmission power. The threshold path loss $L_2$ may be a value determined based on a desired FER and BER.

If, at step 512, a determination is made that $L_c$ is less than or equal to $L_1$ and greater than $L_2$, the process moves to step 514. At step 514, control processor 218 then determines if the transmit power head room for transmitting at 19.2 kbps exists by determining whether the necessary transmit power for 19.2 kbps to achieve the desired Eb/No with a loss of $L_c$ is within the maximum allowable transmit power for mobile station 114. If a determination is made that the transmit power head room for transmitting at 19.2 kbps exists, the process moves to step 516. At step 516, control processor 218 generates the appropriate control signals so that mobile station 114 transmits the access probes of FIGS. 4A and 4B using a message capsule with data transmitted at a rate of 19.2 kbps having a frame of 10 msec in length and initial power IP set for 19.2 kbps. The process then ends at step 518. If, however, at step 514, a determination is made that the transmit power head room for transmitting at 19.2 kbps does not exist, the process moves to step 508 and transmits the access probes of FIGS. 4A and 4B using a message capsule with data transmitted at a rate of 9.6 kbps having a frame of 20 msec in length and initial power IP set for 9.6 kbps. The process then ends at step 510.

If, however, at step 512, a determination is made that $L_c$ is not greater than $L_2$, the process moves to step 520. At step 520, control processor 218 determines if the transmit power head room for transmitting at 38.4 kbps exists by determining whether the necessary transmit power for 38.4 kbps to achieve the desired Eb/No with a loss of $L_c$ is within the maximum allowable transmit power for mobile station 114. If the transmit power head room for transmitting at 38.4 kbps exists, the process moves to step 522. At step 522, control processor 218 generates appropriate control signals so that mobile station 114 transmits the access probes of FIGS. 4A and 4B using a message capsule with data transmitted at a rate of 38.4 kbps having a frame of 5 msec in length and initial power IP set for 38.4 kbps. The process then ends at step 524. If, however, at step 520, a determination is made that power head room for transmitting at 38.4 kbps does not exist, the process moves to step 514. At step 514, control processor 218 determines if the transmit power head room for transmitting at 19.2 kbps exists. If a determination is made that the transmit power head room for transmitting at 19.2 kbps exists, the process moves to step 516. At step 516, control processor 218 generates the appropriate control signals so that mobile station 114 transmits the access probes of FIGS. 4A and 4B using a message capsule with data transmitted at a rate of 19.2 kbps having a frame of 10 msec in length and initial power IP set for 19.2 kbps. The process then ends at step 518. If, however, at step 514, a determination is made that the transmit power head room for transmitting at 19.2 kbps does not exist, the process moves to step 508 and transmits the access probes of FIGS. 4A and 4B using a message capsule with data transmitted at a rate of 9.6 kbps having a frame of 20 msec in length and initial power IP set for 9.6 kbps. The process then ends at step 510.

While the embodiment shown utilizes a set frame size for each of the different data rates that may be used for access, it is within the scope of the invention to provide multiple frame sizes for use with each possible data rate. For example, 38.4 kbps could be used with frame sizes of 5, 10 or 20 msec; 19.2 kbps could be used with frame sizes of 10 or 20 msec; and 9.6 kbps could be used with frame sizes of 20 msec. In this case, process steps 516 and 522 may involve access using varying frame sizes. Also, it is within the scope of the invention to determine the access data rate based on predetermined algorithms using parameters other than path loss or to perform the access data rate determination within other than the mobile station. For example, the access data rate may be calculated at the base station, and the appropriate information could then be transmitted to the mobile station to inform the mobile station of the data rate and frame size to use on the access channel.

Therefore, while the invention has been particularly shown and described with respect to preferred embodiments thereof, it will be understood by those skilled in the art that changes to form and details may be made therein without departing from the spirit and scope of the invention.

What is claimed is:

1. A method for accessing a telecommunications system, said method comprising the steps of:

determining, based on channel conditions and access time requirements for a type of service, a selected data rate from a plurality of data rates and a selected frame size from a plurality of frame sizes, wherein each of said plurality of frame sizes includes the same number of bits; and accessing said system by transmitting an access probe from a mobile station, said access probe including a message capsule having said selected data rate and said selected frame size, selecting during said step of determining.

2. The method of claim 1, wherein said step of determining a selected data rate and a selected frame size comprises the steps of:

determining an estimated path loss for transmissions from a mobile station to a base station; and determining a selected data rate from a plurality of data rates, said selected data rate being the maximum data rate of said plurality of data rates that may be transmitted from said mobile station to said base station while incurring a path loss at the level of said estimated path loss.

3. The method of claim 2, wherein said step of determining an estimated path loss comprises the steps of:

receiving, at a mobile station, a signal transmitted from a base station at a transmission power level $P_{pt}$;

measuring received signal strength $P_{pr}$ of said signal at said mobile station; and calculating an estimated path loss as the difference between $P_{pt}$ and $P_{pr}$.

4. The method of claim 1, wherein said plurality of data rates comprises data rates of 9.6 kbps, 19.2 kbps and 38.4 kbps, and said plurality of data frames comprises data frames of sizes 20 msec, 10 msec and 5 msec.

5. The method of claim 1, wherein said selected data rate at a first data rate has a first frame size, and said selected rate at a second data rate slower than said first data rate has a second frame size larger than said first frame size.

6. The method of claim 1, wherein said plurality of frame sizes comprises frame sizes of 20 msec, 10 msec, and 5 msec.

7. The method of claim 6, wherein said step of determining a selected data rate comprises the steps of:

determining an estimated path loss for transmission from a mobile station to a base station; and determining, at a mobile station, a selected data rate from a plurality of data rates, said selected data rate being the maximum data rate of said plurality of data rates that may be transmitted from said mobile station to said base station while incurring a path loss at the level of said estimated path loss.

8. The method of claim 7, wherein said step of determining an estimated path loss comprises the steps of:

receiving, at a mobile station, a signal transmitted from a base station at a transmission power level $P_{pt}$;

measuring received signal strength $P_{pr}$ of said signal at said mobile station; and calculating an estimated path loss as the difference between $P_{pt}$ and $P_{pr}$.

9. The method of claim 1, wherein said plurality of data rates comprises a data rate of 9.6 kbps, 19.2 kbps and 38.4 kbps, and wherein said data rate of 9.6 kbps is associated with at least a frame size of 20 msec, said data rate of 19.2 kbps is associated with at least a frame size of 10 msec, and said data rate of 38.4 kbps is associated with at least a frame size of 5 msec.

10. A method of accessing a telecommunications system, said method comprising the steps of:

determining whether channel conditions for transmissions from a mobile station to a base station do not meet predetermined criteria for transmission of an access signal at a first data rate and first frame size including a selected number of bits, wherein said first data rate and first frame size allow access to said system with a first access time and are preferred for accessing the system for a selected type of service; and if it is so determined, transmitting an access signal to access the telecommunication system, the access signal transmitted at a second data rate and second frame size including said selected number of bits, wherein said second data rate is less than said first data rate, and said second frame size is larger than said first frame size, wherein said second data rate and said second frame size allow access to said system with a second access time and are less preferred for accessing said selected type of service than said first data rate and first frame size; else if it is determined that said channel conditions meet said predetermined criteria, transmitting said access signal to access the telecommunications system at said first data rate and said first frame size including said selected number of bits.

11. The method of claim 10, wherein said step of determining comprises the steps of:

determining an estimated path loss for transmissions from a mobile station to a base station; and determining whether said estimated path loss is greater than a maximum path loss, said maximum path loss being the maximum path loss for an access signal transmitted at a first data rate.

12. An apparatus for accessing a telecommunications system, said apparatus comprising:

a processor, said processor for determining a selected data rate from a plurality of data rates and a selected frame size from a plurality of frame sizes, wherein each of said plurality of frame sizes includes the same number of bits, based on channel conditions and access time requirements for a type of service, wherein said processor determines said selected data rate by determining an estimated path loss from said mobile station to a base station, and wherein said selected data rate is determined as the maximum data rate of said plurality of data rates that may be transmitted from said mobile station to said base station while incurring a path loss at the level of said estimated path loss, said processor further for generating at least one control signal; and a transmitter, said transmitter for receiving said at least one control signal and transmitting, in response to receiving said at least one control signal, an access probe to access the telecommunications system, the access probe including a message capsule having said selected data rate and said selected frame size.

13. The apparatus of claim 12, further comprising a receiver for receiving a signal transmitted from said base station at a transmission power level $P_{pt}$ and measuring a received signal strength $P_{pr}$ of said signal, and wherein said processor determines said estimated path loss as the difference between $P_{pt}$ and $P_{pr}$.

14. The apparatus of claim 12, wherein said plurality of data rates comprises data rates of 9.6 kbps, 19.2 kbps and 38.4 kbps, and said plurality of data frames comprises data frames of sizes 20 msec, 10 msec and 5 msec.

15. The apparatus of claim 12, wherein said selected data rate at a first data rate has a first frame size, and said selected data rate at a second data rate slower than said first data rate has a second frame size larger than said first frame size.

16. The apparatus of claim 12, wherein said plurality of frame sizes comprises frame sizes of 20 msec, 10 msec and 5 msec.

17. The apparatus of claim 16, wherein said processor determines said selected data rate by determining an estimated path loss from said mobile station to a base station, and said selected data rate is determined as the maximum data rate of said plurality of data rates that may be transmitted from said mobile station to said base station while incurring a path loss at the level of said estimated path loss.

18. The apparatus of claim 17, further comprising a receiver for receiving a signal transmitted from said base station at a transmission power level $P_{pt}$ and measuring a received signal strength $P_{pr}$ of said signal, and wherein said processor determines said estimated path loss as the difference between $P_{pt}$ and $P_{pr}$.

19. The apparatus of claim 12, wherein said plurality of data rates comprises a data rate of 9.6 kbps, 19.2 kbps and 38.4 kbps, and wherein said data rate of 9.6 kbps is associated with at least a frame size of 20 msec, said data rate of 19.2 kbps is associated with at least a frame size of 10 msec, and said data rate of 38.4 kbps is associated with at least a frame size of 5 msec.

20. An apparatus for accessing a telecommunications system, said apparatus comprising:

means for determining whether channel conditions for transmissions from a mobile station to a base station do not meet predetermined criteria for transmission of an access signal at a first data rate and first frame size including a selected number of bits, wherein said first data rate and first frame size allow access to said system with a first access time and are preferred for accessing the system for a selected type of service;

means for transmitting an access signal, to access the telecommunications system, at a second data rate and second frame size including said selected number of bits, wherein said second data rate is less than said first data rate and said second frame size is larger than said first frame size, if said channel conditions do not meet said predetermined criteria, wherein said second data rate and second frame size allow access to said system with a second access time and are less preferred for accessing said selected type of service than said first data rate and first frame size; and means for transmitting said access signal, to access the telecommunications system, at said first data rate and first frame size including said selected number of bits, if it is determined that said channel conditions meet said predetermined criteria.

21. The apparatus of claim 20, wherein said means for determining comprises:

means for determining an estimated path loss for transmissions from a mobile station to a base station; and means for determining whether said estimated path loss is greater than a maximum path loss, said maximum path loss being the maximum path loss for an access signal transmitted at a first data rate.

22. An apparatus for accessing a channel in a telecommunication system, said apparatus comprising:

a processor for selecting, for an access transmission on the channel, at least a first or a second transmission frame from a plurality of available transmission frames, wherein each of said available transmission frames has a selected data rate of a plurality of data rates and a selected frame size of a plurality of frame sizes, wherein said first and second transmission frames each have different frame sizes of said plurality of frame sizes and different data rates of said plurality of data rates, wherein said first and second transmission frames each carry the same number of bits, the transmission frame selected of said first or second transmission frames by said processor carries said same number of bits, and wherein available transmission frames include a transmission frame of data rate 9.6 kbps and duration 20 msec., a transmission frame of data rate 19.2 kbps and duration 10 msec., and a transmission frame of data rate 38.4 kbps and a duration 5 sec.

23. The apparatus of claim 22, wherein said access transmission includes a preamble portion and a message portion, wherein said processor selects a selected transmission frame from said at least a first or a second transmission frame, wherein said message portion includes said selected transmission frame and, wherein said apparatus further comprises a transmitter for transmitting said access transmission.

24. A mobile station, said mobile station for transmitting to a base station, an access transmission on a channel, the access transmission comprising a preamble and at least one message frame, wherein said mobile station is configured to transmit said message frame having at least a first duration and first data rate carrying a selected number of bits or a second duration, different from said first duration, and second data rate, different from said first data rate, also carrying said selected number of bits.

25. The mobile station of claim 24, wherein said mobile station transmits said preamble on a pilot channel and transmits said at least one message frame on an access channel.

26. The mobile station of claim 24, wherein said mobile station transmits packet data within said at least one message frame.

27. The mobile station of claim 24, wherein said at least one message frame has said first duration and first data rate, said second duration and said second data rate or, a third duration and third data rate also carrying said selected number of bits, and wherein said first, second, and third durations comprise 20 msec., 10 msec., and 5 msec., respectively, and wherein said first, second and third data rates comprise 9.6 kbps, 19.2 kbps, and 38.4 kbps, respectively.

28. A base station for receiving an access transmission from a mobile station on a channel, wherein said access transmission comprises a preamble and at least one message frame, and said message frame having at least a first duration and first data rate carrying a selected number of bits or a second duration, different from said first duration, and second data rate, different from said first data rate, also carrying said selected number of bits.

29. The base station of claim 28, wherein said message frame has at least said first duration and said first data rate carrying said selected number of bits, said second duration and said second data rate also carrying said selected number of bits, or a third duration, different from said first and second duration, and third data rate, different from said first and second data rate, carrying said selected number of bits.

30. The base station of claim 29, wherein said first data rate comprises 9.6 kbps., and said first duration comprises 20 msec., wherein said second data rate comprises 19.2 kbps., and said second duration comprises 10 msec., and wherein said third data rate comprises 38.4 kbps and said third duration comprises 5 msec.

* * * * *

UNITED STATES PATENT AND TRADEMARK OFFICE
CERTIFICATE OF CORRECTION

PATENT NO. : 6,775,548 B1 Page 1 of 1
DATED : August 10, 2004
INVENTOR(S) : Rong et al.

It is certified that error appears in the above-identified patent and that said Letters Patent is hereby corrected as shown below:

Column 13,
Line 8, "5 sec" should read -- 5 msec --.

Signed and Sealed this

Thirty-first Day of January, 2006

JON W. DUDAS
*Director of the United States Patent and Trademark Office*